United States Patent [19]

Shinler

[11] Patent Number: 5,275,499
[45] Date of Patent: Jan. 4, 1994

[54] COUPLING FOR VALVE SPOOL ACTUATOR ASSEMBLY

[75] Inventor: Kevin L. Shinler, North Branch, Minn.

[73] Assignee: Dana Corporation, Toledo, Ohio

[21] Appl. No.: 946,397

[22] Filed: Sep. 17, 1992

[51] Int. Cl.$^5$ .......................... F16D 1/02; F16C 11/02
[52] U.S. Cl. .................................... 403/117; 403/151; 403/157
[58] Field of Search ................. 403/150, 151, 157, 117

[56] References Cited

U.S. PATENT DOCUMENTS

| | | |
|---|---|---|
| 648,079 | 4/1900 | Prince, Jr. |
| 1,774,219 | 8/1930 | Ackerman |
| 1,943,364 | 1/1934 | Betz |
| 2,644,731 | 7/1953 | Doeg |
| 3,670,630 | 6/1972 | Tyson et al. |
| 4,070,122 | 1/1978 | Wisner |
| 4,593,608 | 6/1986 | Corey et al. |
| 4,777,844 | 10/1988 | Debell et al. |

FOREIGN PATENT DOCUMENTS

| | | |
|---|---|---|
| 871646 | 1/1942 | France |
| 970693 | 6/1950 | France |
| 803286 | 10/1958 | United Kingdom |

OTHER PUBLICATIONS

Gresen Hydraulic Components Catalog SC-1103, copyright 1987.

Primary Examiner—Randolph A. Reese
Assistant Examiner—Christopher J. Novosad
Attorney, Agent, or Firm—MacMillan, Sobanski & Todd

[57] ABSTRACT

A coupling for connecting a movable link member of a valve actuator assembly to a movable valve spool in a fluid control valve includes a swivel spud secured to the end of the valve spool. The swivel spud has a semi-spherical outer end surface and first and second transverse apertures formed therethrough. A first cylindrical pin is retained within the first aperture of the swivel spud. The actuator assembly further includes a movable inner piston having an end portion, which is generally hollow and cylindrical in shape, and a pair of opposed apertures formed therethrough. The semi-spherical outer end surface of the swivel spud is received within the hollow end portion of the inner actuator piston. A second pin is retained in the opposed apertures of the inner actuator piston, extending through the second aperture of the swivel spud. When the inner actuator piston is moved in one direction, the pins engage one another to effect movement of the valve spool in that direction. When the inner actuator piston is moved in an opposite direction, the semi-spherical surface of the swivel spud engages a flat reaction surface of the inner actuator piston to effect movement of the valve spool in that direction.

19 Claims, 2 Drawing Sheets

COUPLING FOR VALVE SPOOL ACTUATOR ASSEMBLY

BACKGROUND OF THE INVENTION

This invention relates in general to couplings between movable mechanical members and in particular to an improved coupling structure for connecting a movable link member of an actuator assembly to a movable valve spool in a fluid control valve.

In many hydraulic and pneumatic systems, control valves are provided for controlling the flow of fluid (either in liquid or gaseous form) from a pressurized source to one or more controlled devices. Most fluid control valves of this type include a case having a bore formed therethrough. Within the bore, a valve spool is mounted for limited axial movement. The valve spool has a plurality of circumferential grooves formed thereabout. A plurality of ports are formed in the case which communicate with the bore by means of respective passageways. The various ports of the control valve communicate with the pressurized source, the controlled devices, and a fluid reservoir. By moving the valve spool axially within the bore, certain ports are placed in fluid communication with other ports. As a result, the operation of the controlled devices is regulated in a desired manner.

A variety of structures are known for effecting movement of the valve spool relative to the case. In many fluid control valves, a manually operable handle is pivotably mounted on the case. The handle is typically connected through a link member to the valve spool such that manual pivoting movement of the handle causes axial movement of the valve spool. Manually operable fluid control valves such as this are suitable for use in hydraulic and pneumatic systems where it is possible to locate such fluid control valves conveniently for an operator to grasp and manipulate.

In other hydraulic and pneumatic systems, the fluid control valves are not or cannot be so conveniently located. In those systems, the fluid control valve is provided with a remotely controllable actuator in lieu of the manually operable handle. The actuator includes an internal member which is movable in response to an external signal generated by the operator. Movement of the internal member of the actuator may be accomplished in response to any known signal, such as electrical, hydraulic, or pneumatic. As with the manually operable handle, the movable internal member of the actuator is typically connected by a link member to the valve spool for movement therewith.

Regardless of whether the fluid control valve is operated by means of a manually operable handle or a remotely controllable actuator, some mechanical connection is necessary between the link member and the valve spool. This mechanical connection is sometimes difficult to achieve because the case of the fluid control valve is usually formed separately from the housing for the actuating mechanism, whether it be a manually operable handle or a remotely controllable actuator. Because of manufacturing tolerances, the axis of movement of the link member is rarely co-axial with the axis of movement of the valve spool connected thereto. Improper alignment of these axes can cause undesirable side loading or binding of the link member and the valve spool, resulting in premature wear and failure.

To address this, it is known to provide a mechanical connection between the link member and the valve spool which can accommodate a limited amount of misalignment between the respective axes of movement. However, known mechanical connections of this type have been somewhat complicated in structure and bulky in size. Furthermore, known mechanical connections do not always accommodate for misalignment in more than one plane. Thus, it would be desirable to provide an improved coupling structure for connecting a movable link member of a valve actuator to a movable valve spool in a fluid control valve which is simple, compact, and inexpensive in construction.

SUMMARY OF THE INVENTION

This invention relates to an improved coupling structure for connecting a movable link member of a valve actuator assembly to a movable valve spool in a fluid control valve. The actuator assembly includes a swivel spud which is secured to the end of the valve spool for movement therewith. The swivel spud has a semi-spherical outer end surface and first and second apertures formed therethrough. A first cylindrical pin is frictionally retained within the first aperture of the swivel spud. The actuator assembly further includes a movable inner piston which functions as the link member. The inner actuator piston has an end portion, which is generally hollow and cylindrical in shape, and a pair of opposed apertures formed therethrough. The semi-spherical outer end surface of the swivel spud is received within the hollow end portion of the inner actuator piston. A second pin is frictionally retained in the opposed apertures of the inner actuator piston, extending through the second aperture of the swivel spud. Preferably, the second pin extends transversely to the first pin in abutting contact therewith. When the inner actuator piston is moved in one direction, the pins engage one another to effect movement of the valve spool in that direction. When the inner actuator piston is moved in an opposite direction, the semi-spherical surface of the swivel spud engages a flat reaction surface of the inner actuator piston to effect movement of the valve spool in that direction. Because there is essentially only a single point of contact during such movements, axial misalignment between the valve spool and the inner actuator piston is accommodated for movement in either axial direction.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
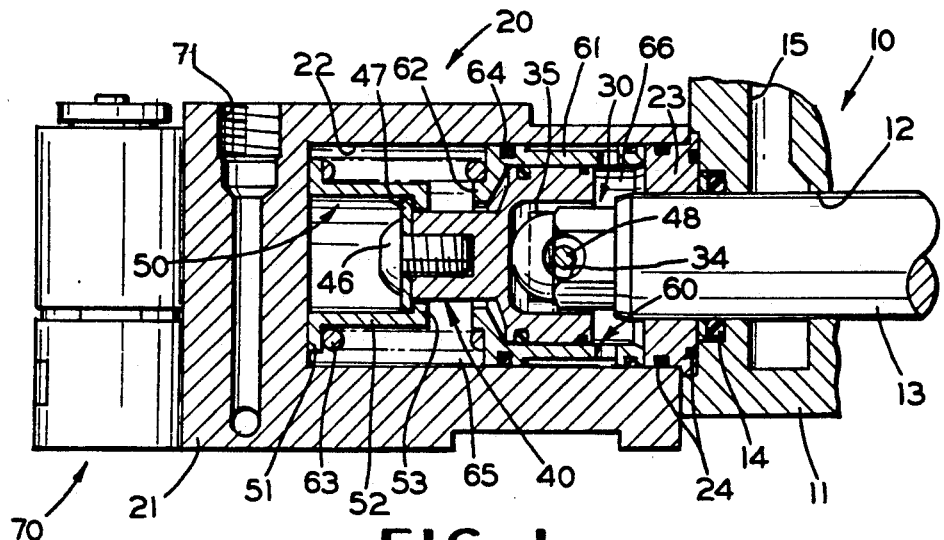
FIG. 1 is a sectional elevational view of a portion of a control valve including an improved actuator coupling in accordance with this invention, wherein the valve spool is shown in a central position.

Referring now to the drawings, there is illustrated in FIG. 1 a portion of a fluid control valve, indicated generally at 10. The fluid control valve 10 is conventional in the art, including a case 11 having a bore 12 formed therethrough. Within the bore 12, a valve spool 13 is mounted for limited axial movement. The inner surface of the bore 12 has an annular recess formed therein, within which an O-ring 14 or similar seal is disposed. The O-ring 14 provides a relatively fluid-tight seal between the case 11 and the valve spool 13, while permitting relative axial movement therebetween.

The valve spool 13 has a plurality of circumferential grooves (not shown) formed thereabout. A plurality of ports (not shown) are formed in the case 11 which communicate with the bore 12 by means of respective passageways, one of which is illustrated at 15. In a manner which is well known in the art, the various ports of the fluid control valve 10 communicate with a source of pressurized fluid, one or more controlled devices, and a fluid reservoir. By moving the valve spool 13 axially within the bore 12, certain ports are placed in communication with other ports. As a result, the operation of the controlled devices is regulated in a desired manner.

An actuator assembly, indicated generally at 20, is mounted on the side of the case 11 of the fluid control valve 10. Although the actuator assembly 20 will be described and illustrated in the preferred embodiment of a solenoid activated pneumatic actuator, it will be appreciated that other actuator structures (including manually operable actuators) may be employed. The actuator assembly 20 includes a housing 21 which is secured to the case 11 of the fluid control valve 10 by any conventional means, such as by a plurality of threaded fasteners (not shown). An enlarged bore 22 is formed in the side of the housing 21 which faces toward the case 11. An annular seal plate 23 is disposed between that side of the housing 21 and the case 11. The seal plate 23 has a pair of annular recesses formed therein, within which respective O-rings 24 or similar seals are disposed. The O-rings 24 provide a relatively fluid-tight seal between the housing 21, the seal plate 23, and the case 11. The end of the valve spool 13 extends through a central opening in the seal plate 23 into the interior of the housing bore 22.

Figure 4:
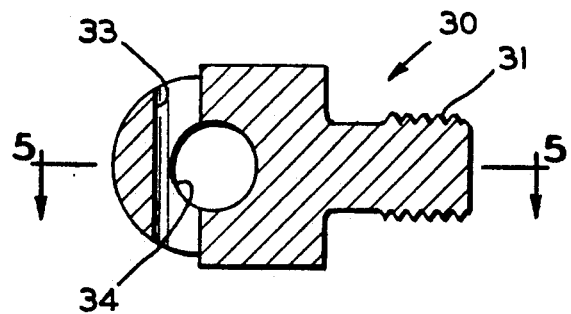
FIG. 4 is a sectional elevational view of the swivel spud illustrated in FIGS. 1 through 3.
Figure 5:
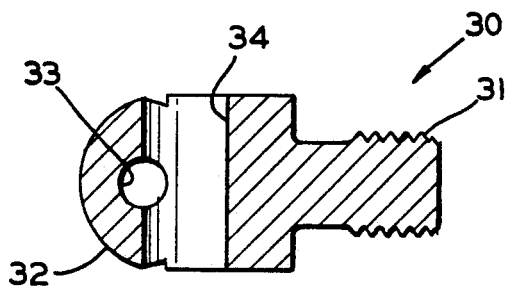
FIG. 5 is a sectional elevational view of the swivel spud taken along line 5—5 of FIG. 4.

The actuator assembly 20 further includes a swivel spud, indicated generally at 30, which is secured to the end of the valve spool 13. The structure of the swivel spud 30 is more clearly illustrated in FIGS. 4 and 5. As shown therein, the swivel spud 30 includes a first end portion 31 having a threaded outer surface. The threaded end portion 31 of the swivel spud 30 is threaded into a corresponding threaded bore (not shown) formed in the end of the valve spool 13. Thus, the swivel spud 30 and the valve spool 13 are secured for movement together. The swivel spud 30 further includes a second end portion 32 having a semi-spherical outer surface. Between the two end portions 31 and 32, first and second apertures 33 and 34 are formed through the swivel spud 30. The diameter of the first aperture 33 is smaller than the diameter of the second aperture 34, for a reason which will be explained below.

In the preferred embodiment, the first and second apertures 33 and 34 are oriented perpendicular to one another.

Referring back to FIG. 1, a first pin 35 is disposed within the first aperture 33 of the swivel spud 30. The first pin 35 is preferably formed in the shape of a cylinder having an outer diameter which is slightly larger than the inner diameter of the first aperture 33. Thus, the first pin 35 is pressed into and frictionally retained within the first aperture 33. The purpose of the first pin 35 will be explained below.

Figure 6:
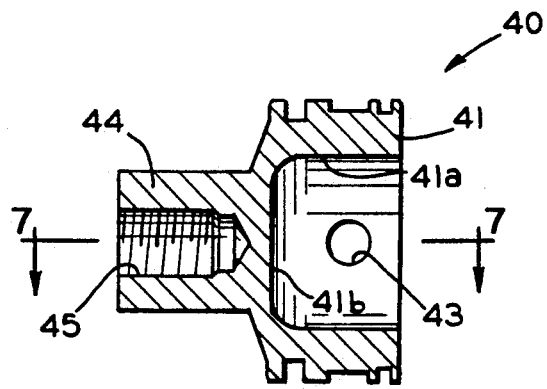
FIG. 6 is a sectional elevational view of the inner actuator piston illustrated in FIGS. 1 through 3.
Figure 7:
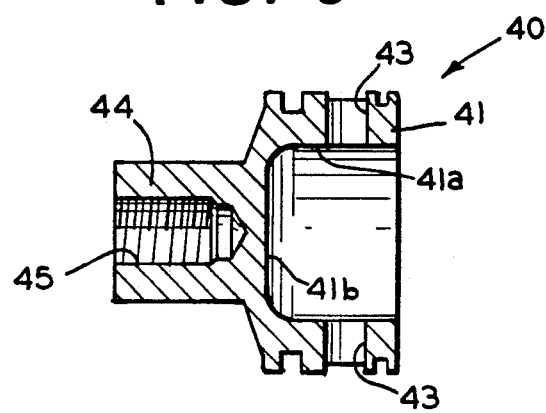
FIG. 7 is a sectional elevational view of the inner actuator piston taken along line 7—7 of FIG. 6.

The actuator assembly 20 further includes an inner actuator piston, indicated generally at 40, which is provided within the bore 22 of the housing 21 adjacent to the swivel spud 30. The structure of the inner actuator piston 40 is more clearly illustrated in FIGS. 6 and 7. As shown therein, the inner actuator piston 40 includes a first end portion 41 which is generally hollow and cylindrical in shape, defining a cylindrical inner surface 41a and a reaction surface 41b therein. A first pair of opposed apertures 42 are formed through the first end portion 41. A second pair of opposed apertures 43 are also formed through the first end portion 41. Preferably, the second pair of apertures 43 define an axis which is perpendicular to an axis defined by the first pair of apertures 42. The purpose of these opposed pairs of apertures recesses 42 and 43 will be explained below.

The inner actuator piston 40 further includes a second end portion 44 which is generally cylindrical in shape, having a threaded bore 45 formed therein. Referring back to FIG. 1, it can be seen that a threaded fastener 46 is threaded into the threaded bore 45 of the second end portion 44 of the inner actuator piston 40. The threaded fastener 46 extends through an annular washer 47. The threaded fastener 46 is formed having an enlarged head portion which retains the washer 47 against the second end portion 44 of the inner actuator piston 40 for movement therewith. The purpose of the washer 47 will be explained below.

Referring back to FIG. 1, a second pin 48 extends through the second aperture 34 of the swivel spud 30. The ends of the second pin 48 extend into the first apertures 42 formed through the inner actuator piston 40. The second pin 48 is preferably formed in the shape of a cylinder having an outer diameter which is slightly larger than the inner diameter of such first apertures 42. Thus, the second pin 48 is pressed into and frictionally retained within the first apertures 42 of the inner actuator piston 40. Preferably, the second pin 48 extends transversely to the first pin 33 in abutting contact therewith. The purpose of the second pin 42 will be explained below.

The actuator assembly 20 further includes a spring retainer, indicated generally at 50, which is provided within the bore 22 of the housing 21 adjacent to the inner actuator piston 40. As shown in FIG. 1, the spring retainer 50 includes an outwardly extending flange portion 51, a central hollow cylindrical portion 52, and an inwardly extending flange portion 53. The outwardly extending flange portion 51 normally abuts the innermost end of the bore 22 of the housing 20. The central portion 52 extends over the washer 47 secured to the second end portion 44 of the inner actuator piston 40. The inwardly extending flange portion 53 extends inwardly about the washer 47. The purpose of the spring retainer 50 will be explained below.

The actuator assembly 20 further includes an outer actuator piston, indicated generally at 60, which is provided within the bore 22 of the housing 21 and is disposed about the inner actuator piston 40. As shown in FIG. 1, the outer actuator piston 60 includes a central hollow cylindrical portion 61 having an inwardly extending flange portion 62 provided at one end. The central portion 61 extends over the first end portion 41 of the inner actuator piston 40. The inwardly extending flange portion 62 extends inwardly about the second end portion 44 of the inner actuator piston 40. The inwardly extending flange portion 62 provides a seat for one end of a coiled spring 63 which is disposed about the second end portion 44 of the inner actuator piston 40 and the spring retainer 50. The other end of the spring 63 seats on the outwardly extending flange portion 51 of the spring retainer 50.

The outer actuator piston 60 has an annular recess formed therein, within which an O-ring 64 or similar seal is disposed. The O-ring 64 provides a relatively fluid-tight seal between the housing 21 and the outer actuator piston 60. As a result, the bore 22 formed in the housing 20 is divided into left and right fluid chambers, respectively identified at 65 and 66 in FIG. 1. The purpose of the outer actuator piston 60 and the two chambers 65 and 66 will be explained below.

Lastly, the actuator assembly 20 further includes a solenoid valve assembly, indicated generally at 70. The solenoid valve assembly 70 is conventional in the art and is adapted to selectively provide fluid communication between an air inlet 71 formed in the housing 21 and the chambers 65 and 66 defined within the bore 22. The air inlet 71 typically communicates with a source of pressurized fluid. Also, the solenoid valve assembly 70 is adapted to selectively provide fluid communication between the chambers 65 and 66 defined within the bore 22 and the atmosphere. As will be explained below, by selectively pressurizing and venting the chambers 65 and 66, the actuator assembly 20 can be operated to move the valve spool 13 axially back and forth relative to the case 11.

As mentioned above, FIG. 1 illustrates the valve spool 13 in a central position relative to the case 11. This is the position in which the valve spool 13 would be maintained if both of the chambers 65 and 66 were not pressurized. Because of the lack of a pressure differential across the inner actuator piston 40, the spring 63 urges the spring retainer 50 and the outer actuator piston 60 apart from one another. Thus, the spring retainer 50 abuts the innermost end of the bore 22 of the housing 20, while the opposite end of the outer actuator piston 60 abuts the seal plate 23. Because of the engagement of the inwardly extending flange portion 53 with the washer 47, the inner actuator piston 40 is moved with the spring retainer 50 to this position. Since the end of the valve spool 13 is connected to the inner actuator piston 40 by means of the swivel spud 30 and the second pin 48, the valve spool 13 is also moved to this position.

Figure 2:
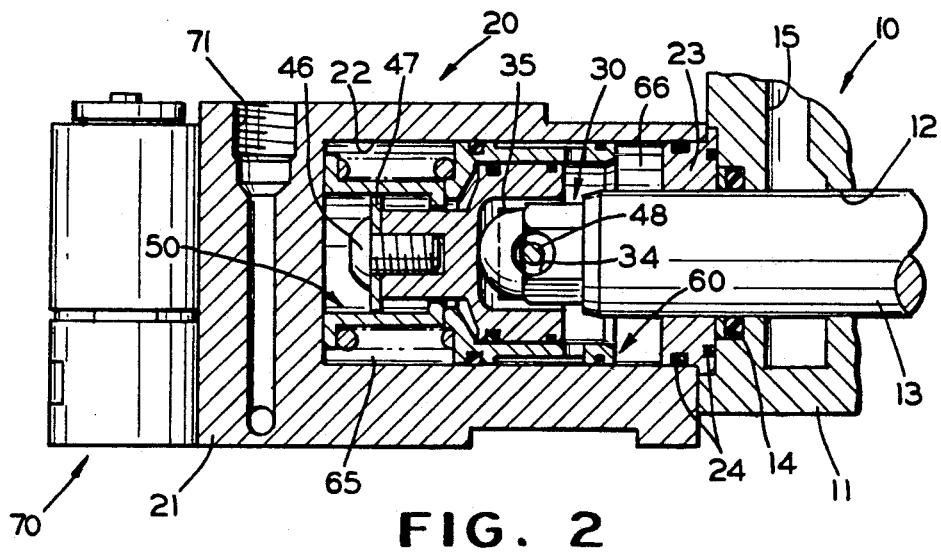
FIG. 2 is a sectional elevational view similar to FIG. 1 wherein the valve spool has been moved toward the left from the central position.

Assume first that it is desired to move the valve spool 13 from the central position illustrated in FIG. 1 toward the left, as shown in FIG. 2. To accomplish this, electrical signals are fed to the solenoid valve assembly 70 causing it to simultaneously vent the left chamber 65 and pressurize the right chamber 66. The pressure differential across the inner actuator piston 40 causes it and the outer actuator piston 60 to move toward the left against the urging of the spring 63. As the inner actuator piston 40 moves toward the left, the second pin 48 (mounted in the inner actuator piston 40) engages the first pin 35 (mounted in the swivel spud 30). Consequently, the valve spool 13 is moved toward the left with the other components of the actuator assembly 20.

As discussed above, the pins 35 and 48 are preferably cylindrical in shape and are oriented perpendicular to one another. As a result, there is essentially only a single point of contact therebetween when the inner actuator piston 40 pulls the valve spool 13 toward the left. This point contact allows the valve spool 13 (which is journalled in the case 11 for axial movement) to float radially relative to the inner actuator piston 40 (which is journalled in the outer actuator piston 60 and the bore 22 for axial movement). Thus, the valve spool 13 and the inner actuator piston 40 need not be precisely coaxially aligned, and undesirable side loading or binding between the two components is avoided.

Figure 3:
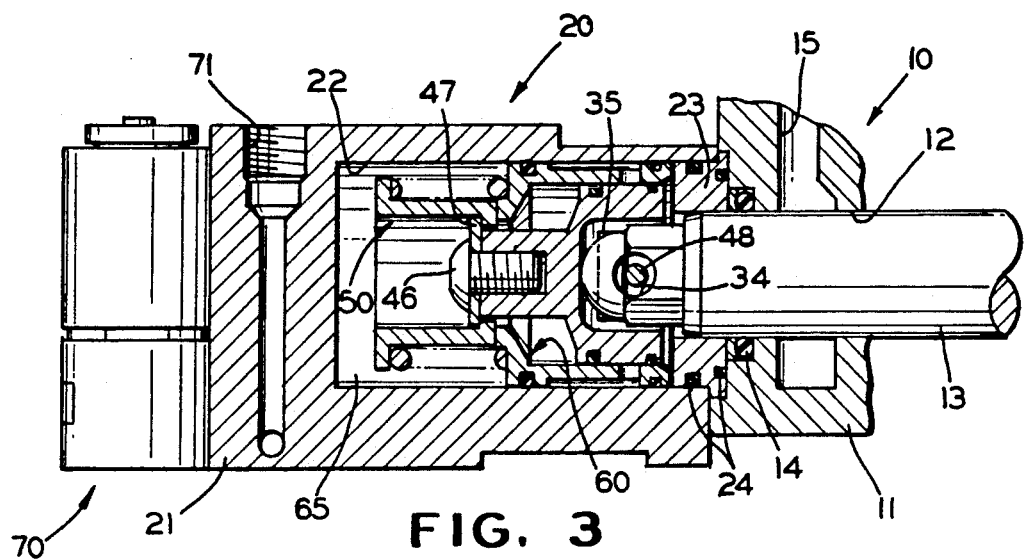
FIG. 3 is a sectional elevational view similar to FIG. 1 wherein the valve spool has been moved toward the right from the central position.

Assume now that it is desired to move the valve spool 13 from the central position illustrated in FIG. 1 toward the right, as shown in FIG. 3. To accomplish this, electrical signals are fed to the solenoid valve assembly 70 causing it to simultaneously pressurize the left chamber 65 and vent the right chamber 66. The pressure differential across the inner actuator piston 40 causes it to move toward the right. Because of the engagement of the inwardly extending flange portion 53 of the spring retainer 50 with the washer 47, the spring retainer 50 is moved toward the right with the inner actuator piston 40 against the urging of the spring 63. As the inner actuator piston 40 moves toward the right, the reaction surface 41b of the recess 41 engages the semi-spherical end portion 32 of the swivel spud 30. Consequently, the valve spool 13 is moved toward the right with the other components of the actuator assembly 20. As with the pins 35 and 48 discussed above, there is essentially only a single point of contact between the reaction surface 41b of the recess 41 and the semi-spherical end portion 32 of the swivel spud 30. Thus, axial misalignment is accommodated for movement of the valve spool 13 in either axial direction.

It should be noted that the inner actuator piston 40 is preferably constructed in such a manner that the effective surface area exposed to the left chamber 65 is approximately the same as the effective surface area exposed to the right chamber 66. Such construction will equalize the pressure differentials created across the inner actuator piston 40 during operation and insure similar action in both directions for a given level of pressurization.

In accordance with the provisions of the patent statutes, the principle and mode of operation of this invention have been explained and illustrated in its preferred embodiment. However, it must be understood that this invention may be practiced otherwise than as specifically explained and illustrated within departing from its spirit or scope.

What is claimed is:

1. A coupling comprising:
   a first member including an end portion having a curved outer and surface and first and second apertures formed therethrough;
   a first pin retained within said first aperture of said first member;
   a second member including a hollow end portion having an outer wall, a reaction end surface, and an aperture formed through said outer wall, said end portion of said first member being disposed within said hollow end portion of said second member such that when said first member is moved toward said second member, said curved outer end surface engages said reaction end surface for moving said first and second members together in a first direction; and a second pin retained within said aperture in said outer wall of said second member and extending through said second aperture of said first member such that when said second member is moved toward said first member, said second pin engages said first pin for moving said first and second members together in a second direction.

2. The coupling defined in claim 1 wherein said first member is connected to one of a valve spool and an actuator assembly for a fluid control valve.

3. The coupling defined in claim 2 wherein said second member is connected to the other of said valve spool and said actuator assembly for said fluid control valve.

4. The coupling defined in claim 1 wherein said curved outer end surface of said first member is generally semi-spherical in shape.

5. The coupling defined in claim 1 wherein said first and second apertures formed through said first member extend perpendicular to one another.

6. The coupling defined in claim 1 wherein said first aperture formed through said first member defines a diameter which is smaller than a diameter defined by said second aperture formed through said first member.

7. The coupling defined in claim 1 wherein said first pin is pressed into and frictionally retained within said first aperture of said first member.

8. The coupling defined in claim 1 wherein said second pin is pressed into and frictionally retained within said aperture of said second member.

9. A coupling comprising:

a first member including an end portion having a curved outer end surface and an aperture formed therethrough;

a first pin carried on said first member and extending at least partially into said aperture thereof;

a second member including a hollow end portion having a reaction end surface, said end portion of said first member being disposed within said hollow end portion of said second member such that when said first member is moved toward said second member, said curved outer end surface engages said reaction end surface for moving said first and second members together in a first direction; and a second pin carried on said second member and extending through said aperture of said first member, said second pin engaging said first pin when said second member is moved toward said first member for moving said first and second members together in a second direction.

10. The coupling defined in claim 9 wherein said first member is connected to one of a valve spool and an actuator assembly for a fluid control valve.

11. The coupling defined in claim 10 wherein said second member is connected to the other of said valve spool and said actuator assembly for said fluid control valve.

12. The coupling defined in claim 9 wherein said curved outer end surface of said first member is generally semi-spherical in shape.

13. The coupling defined in claim 9 further including first and second apertures formed through said first member.

14. The coupling defined in claim 13 wherein said first and second apertures extend perpendicular to one another.

15. The coupling defined in claim 13 wherein said first aperture formed through said first member defines a diameter which is smaller than a diameter defined by said second aperture formed through said first member.

16. The coupling defined in claim 13 wherein said first pin is pressed into and frictionally retained within said first aperture of said first member.

17. The coupling defined in claim 9 further including an aperture formed through said second member.

18. The coupling defined in claim 17 wherein said second pin is pressed into and frictionally retained within said aperture of said second member.

19. A coupling comprising:

a first member including an end portion having a curved outer end surface and an aperture formed therethrough;

a first pin carried on said first member and extending at least partially into said aperture thereof;

a second member including a reaction end surface, said end portion of said first member being disposed adjacent to said reaction end surface such that when said first member is moved toward said second member, said curved outer end surface engages said reaction end surface for moving said first and second members together in a first direction; and a second pin carried on said second member and extending through said aperture of said first member, said second pin engaging said first pin when said second member is moved toward said first member for moving said first and second members together in a second direction.

* * * * *